United States Patent
Jeon

(10) Patent No.: US 6,612,967 B2
(45) Date of Patent: Sep. 2, 2003

(54) KICK DOWN SHIFT CONTROL APPARATUS OF AUTOMATIC TRANSMISSION AND METHOD THEREFOR

(75) Inventor: Byeong Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/971,610

(22) Filed: Oct. 9, 2001

(65) Prior Publication Data

US 2002/0068662 A1 Jun. 6, 2002

(30) Foreign Application Priority Data

Dec. 6, 2000 (KR) ........................ 2000-73880

(51) Int. Cl.$^7$ ............................................. F16H 59/78
(52) U.S. Cl. ......................... 477/98; 477/141; 477/161
(58) Field of Search ........................... 477/97, 98, 156, 477/158, 161, 141

(56) References Cited

U.S. PATENT DOCUMENTS 4,858,496 A * 8/1989 Iwatsuki et al. ............... 477/33
5,816,978 A * 10/1998 Tabata et al. ................ 477/156

* cited by examiner

*Primary Examiner*—Sherry Estremsky
*Assistant Examiner*—Dennis Abdelnour
(74) *Attorney, Agent, or Firm*—Birch, Stewart, Kolasch & Birch, LLP

(57) ABSTRACT

A kick down shift control apparatus of an automatic transmission of a vehicle comprising: vehicle running state sensing means for checking a running state of the vehicle; engine control means for controlling engine outputs in response to a signal sensed by the vehicle running state sensing means and outputting information on the temperature of intake air and the operational state of an air conditioner; shift control means for outputting a control signal to correct the pressure of transmission oil according to the temperature of absorbed air and the operational state of the air conditioner input from the engine control means, if conditions for a kick down shift are met with reception of the signal checked by the vehicle running state sensing means; and driving means for controlling the oil pressure discharged out by the oil pump according to the control signal output from the shift control means and performing a shift by providing the oil pressure for a relevant friction factor, thus relieving an shifting shock that generates at the time of a kick down shift while the output of the engine is reduced due to a high temperature of intake air supplying to the engine or operations of the air conditioner.

3 Claims, 3 Drawing Sheets

KICK DOWN SHIFT CONTROL APPARATUS OF AUTOMATIC TRANSMISSION AND METHOD THEREFOR

BACKGROUND OF THE INVENTION

1. Field of the Invention

The present invention relates to a kick down shift control apparatus of an automatic transmission and more particularly to a kick down shift control apparatus of an automatic transmission which reduces its transmission oil pressure at the time of a kick down shift if the output of an engine is low.

2. Description of the Invention

In general, an automatic transmission applied to an auto vehicle adjusts oil pressure by enabling a shift control apparatus to control a plurality of solenoid valves according to a running speed of a vehicle, the open rate of a throttle valve and other sensed conditions, so that the transmission gear of a target transmission stage is operated for an automatic transmission.

In other words, in the case of the automatic transmission that automatically performs shifts, as described above, if a driver shifts a selection lever to his or her desired range, a manual valve changes to its port and controls the pressure of oil supplied from an oil pump to selectively operate a plurality of operational factors of the transmission gear mechanism according to the duty control of the solenoid valves for accomplishment of shifts. The automatic shift control apparatus determines a shifting stage by a preset program of a memory classified according to the open rate of the throttle valve and a speed of a car and, then, outputs a duty control signal related to the determined shifting stage to the solenoid valve, thus completing a shift.

The automatic transmission that operates according to the aforementioned operational principles may have friction factors in the course of shifting to a target shift stage when it starts or stops its operation. The shifting quality of the automatic transmission is determined depending upon the timings when the friction factors may start or stop their operations.

However, since the conventional automatic transmission performs the kick down shift at the same transmission oil pressure regardless of changes in the output of an engine, there has been a problem of causing a shifting shock to the automatic transmission because there occurs a delay in increasing the number of engine rotations if the kick down shift is carried out while the output of the engine is kept low due to a rising of an intake air temperature or an operation of a car air conditioner.

SUMMARY OF THE INVENTION

It is an object of the present invention to solve the aforementioned problems and provide a kick down shift control apparatus of an automatic transmission and a method therefor, the apparatus which reduces its transmission oil pressure and relieve a shifting shock at the time of a kick down shift while the output of an engine is low due to a rising of an intake air temperature or an operation of a car air conditioner.

In order to accomplish the aforementioned object of the present invention, there is provided a kick down shift control apparatus of an automatic transmission of a vehicle, the apparatus comprising:

vehicle running state sensing means for checking a running state of the vehicle;

engine control means for controlling engine outputs in response to a signal sensed by the vehicle running state sensing means and outputting information on the temperature of intake air and the operational state of an air conditioner;

shift control means for outputting a control signal to correct the pressure of transmission oil according to the temperature of intake air and the operational state of the air conditioner input from the engine control means, if conditions for a kick down shift are met with reception of the signal checked by the vehicle running state sensing means; and driving means for controlling the oil pressure discharged out by the oil pump according to the control signal output from the shift control means and performing a shift by providing the oil pressure for a relevant fiction factor.

In addition, there is also provided a method for controlling a kick down shift of an automatic transmission, the method comprising the steps of:

discriminating whether conditions for a kick down shift are satisfied while a vehicle is in motion;

discriminating whether the temperature of intake air is higher than a reference temperature if all the conditions are satisfied for the kick down shift; and adjusting a transmission oil pressure if the temperature of intake air is higher than the reference temperature, and performing the kick down shift with the adjusted transmission oil pressure.

Also, there may be additional steps of discriminating whether an air conditioner is in operation, adjusting the transmission oil pressure if the air conditioner is in operation, and performing the kick down shift with the adjusted shift oil pressure.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
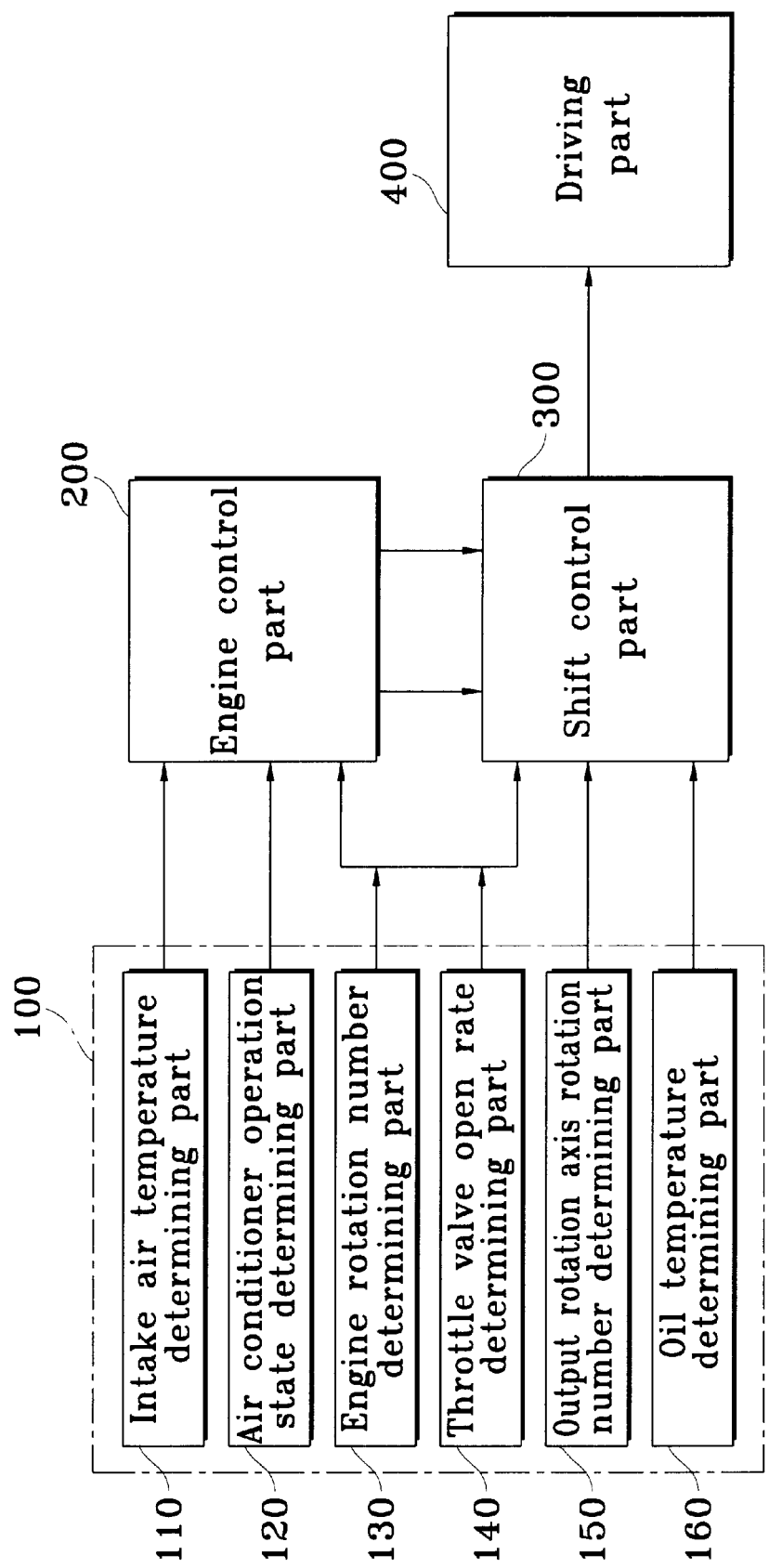
FIG. 1 is a block diagram for illustrating the structure of a shift control apparatus of an automatic transmission in accordance with the present invention.

FIG. 1 is a block diagram for illustrating the structure of a shift control apparatus of an automatic transmission in accordance with the present invention, including a vehicle running state sensing part 100 for checking the running state of the vehicle; an engine control part 200 for controlling an output of an engine by receiving data like the temperature of intake air, an operational state of an air conditioner, the number of engine rotations, the operation of throttle valve from the vehicle running state sensing part 100 and outputting the temperature of intake air, and the operational state of an air conditioner to a shift control part 300; the shift control part 300 for receiving data like the number of engine rotations, the open rate of a throttle valve, the number of rotations of an output axis and the temperature of transmission oil sensed by the vehicle running state sensing part 100 to adjust the transmission oil pressure according to the data including the temperature of intake air and the operational state of the air conditioner input from the engine control part 200 if the kick down shift conditions are satisfied and outputting a predetermined shift control duty signal to perform the kick down shift with the adjusted transmission oil pressure; a driving part 400 for performing a shift by being driven with a predetermined shift control duty signal output by the shift control part 300 to provide the oil pressure discharged and supplied from an oil pump for relevant friction factors.

Furthermore, the vehicle running state sensing part 100 is constructed with an intake air temperature determining part 110 for checking the temperature of intake air, that is, the temperature of the air supplying to an engine of a vehicle; an air conditioner operation state determining part 120 for determining the operational state of an air conditioner depending on the state of the air conditioner switch manipulated by an operator; an engine rotation number determining part 130 for determining the number of rotations of the engine; a throttle valve open rate determining part 140 for determining the open rate of the throttle valve subsequently moving along with the state of an accelerator pedal manipulated by the operator; a rotation number determining part 150 for determining the number of rotations of an output axis of an automatic transmission; and an oil temperature determining part 160 for determining the temperature of the oil of an automatic transmission.

Figure 2:
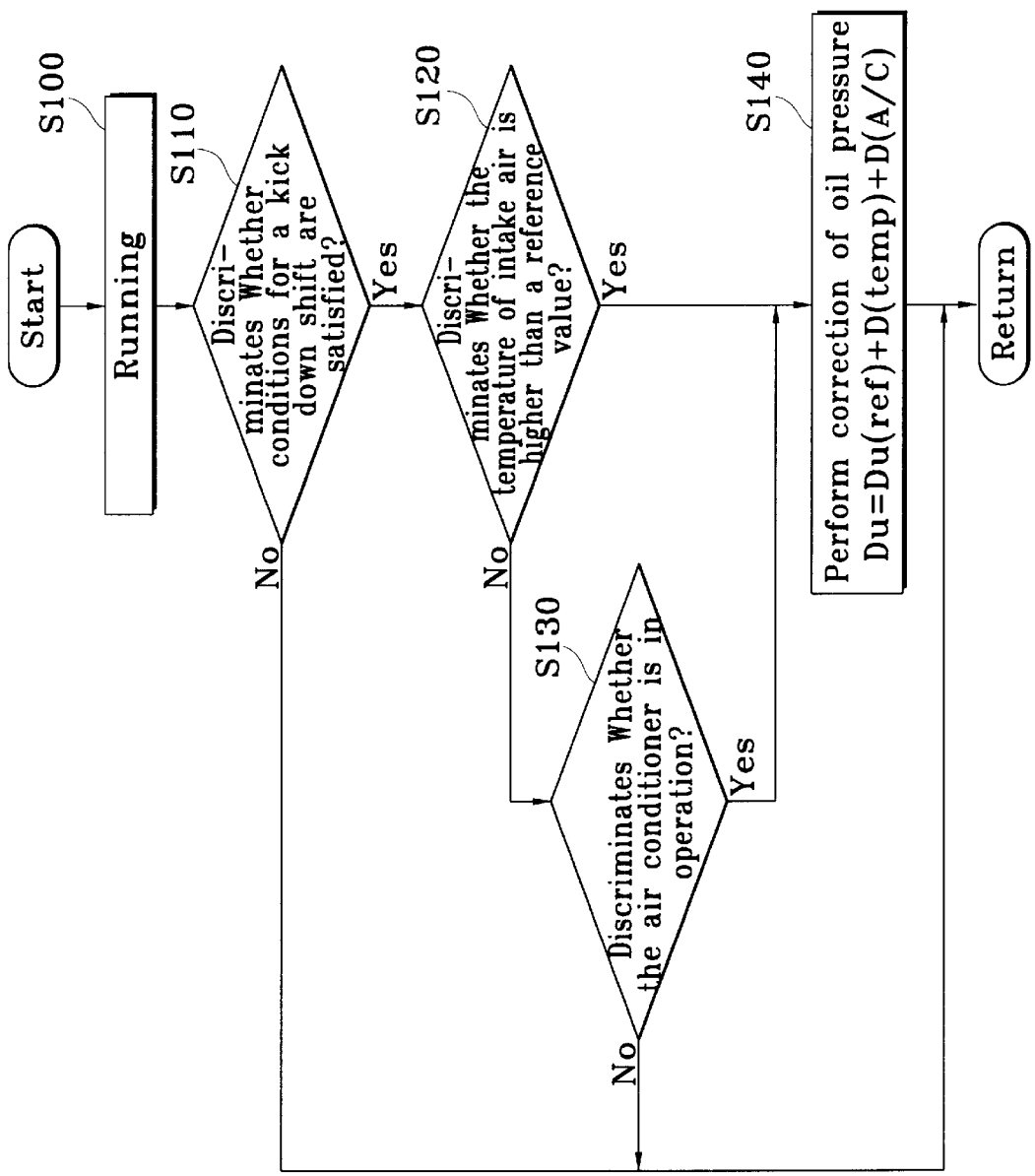
FIG. 2 is a flowchart for illustrating operations of a shift control method of an automatic transmission in accordance with the present invention.
Figure 3:
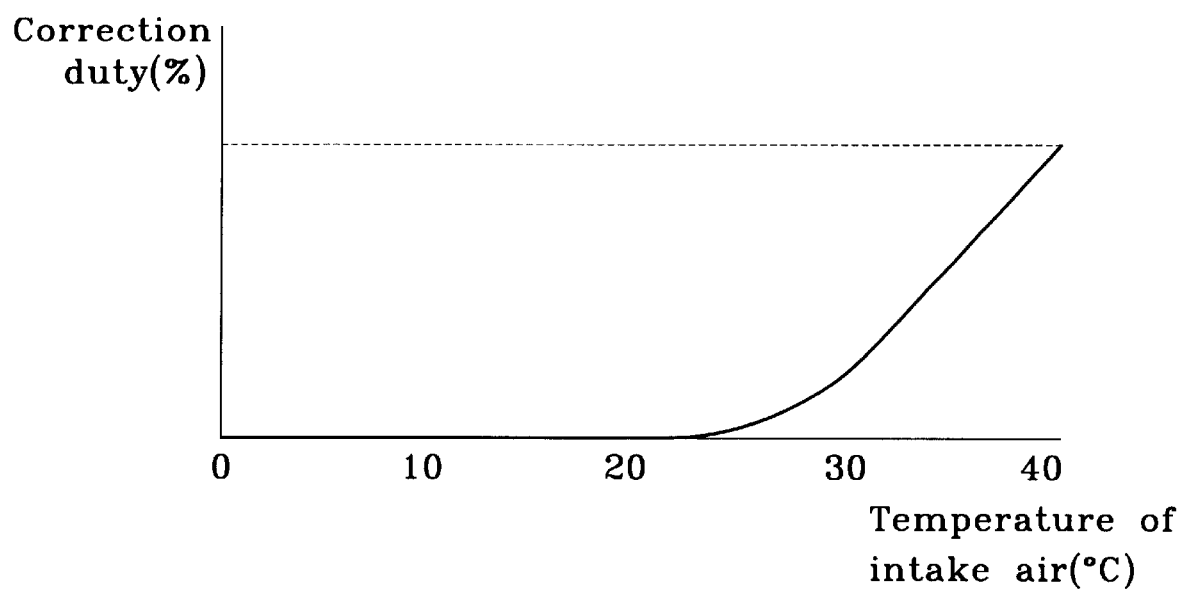
FIG. 3 is a graph for illustrating a method for correcting transmission oil pressure according to an intake air temperature of an engine in the present invention.

Now, a detailed description will be made about operations and effects of the kick down shift control apparatus of an automatic transmission thus constructed and a method therefor with reference to FIGS. 2 and 3. FIG. 2 is a flow chart for illustrating the operational steps of a shift control method of an automatic transmission in accordance with the present invention, where S indicates each operational step.

At first, a driver starts an engine of a vehicle for running at the step of S100. At this time, the engine control part 200 controls the engine of the vehicle by receiving data, such as the temperature of intake air, operational state of an air conditioner, number of rotations of an engine and open rate of a throttle valve determined and input by the vehicle running state determining part 100.

Then, at the step of S110, the shift control part 300 discriminates whether all the conditions required for the kick down shift are satisfied on the basis of data including the number of rotations of the engine, the open rate of the throttle valve, the number of rotations of the output axis and the temperature of transmission oil. If all the conditions for the kick down shift are satisfied, the flow proceeds to the step of S120.

At the step of S120, the shift control part 300 receives the data on the temperature of intake air input from the engine control part 200 and discriminates whether the temperature of intake air is higher than a reference temperature. At this time, if the temperature of intake air is lower than the reference temperature, the flow proceeds to the step of S130. On the contrary, if the temperature of intake air is higher than the reference temperature, the flow advances to the step of S140.

At the step of S130, the shift control part 300 discriminates whether the air conditioner is in operation by receiving the data about the operational state of an air conditioner from the engine control part 200. If the air conditioner is in operation, the flow advances to the step of S140.

In addition, at the step of S140, the shift control apparatus 300 reduces and adjusts the transmission oil pressure according to the temperature of intake air and the operational state of an air conditioner and performs the kick down shift with the reduced and adjusted transmission oil pressure.

In other words, as described in the following mathematical formula 1, the pressure control solenoid valve of the automatic transmission is operated with a duty (Du) obtained by adding the first correction duty (D (temp)) and second correction duty (D (A/C)) to a reference duty (Du (ref)) to reduce the transmission oil pressure at the kick down shift.

[Mathematical Formula 1]

$$Du = Du(\text{ref}) + D(\text{temp}) + D(\text{A/C})$$

In mathematical formula 1, Du (ref) indicates a reference duty preset to adequately control the kick down transmission oil pressure during a normal running state of a vehicle. The first correction duty (D (temp)), as shown in FIG. 3, is determined with the temperature of intake air on the basis of the preset Map Table. Besides, the second correction duty (D(A/C)) is determined with the operational state of an air conditioner at 3% when the air conditioner is in operation and at 0% when the air conditioner is not in operation.

Even if a preferred embodiment of the present invention has been described with the shift control part 300 which controls transmission oil pressure by receiving data about the temperature of intake air and the operational state of an air conditioner from the engine control part 200, the scope of the present invention is not restricted to the preferred embodiment, but it is possible for the shift control part 300 to directly receive the temperature of intake air and the operational state of the air conditioner from the vehicle running state determining part 100 and control the transmission oil pressure.

As described above, there are advantages in the present invention in that the shift control apparatus reduces the transmission oil pressure at the time of a kick down shift, while the output of an engine gets lower due to an increase in the intake air temperature from the vehicle having an automatic transmission and/or the operational state of an air conditioner, thus making identical shifts possible and relieve the shifting shock to thereby provide an identical shift feeling regardless of the temperature of intake air and the operational state of an air conditioner.

What is claimed is:

1. A kick down shift control apparatus of an automatic transmission of a vehicle, the apparatus comprising:

vehicle running state sensing means for checking a running state of the vehicle;

engine control means for controlling engine outputs in response to a signal sensed by the vehicle running state sensing means and outputting information on the temperature of intake air and the operational state of an air conditioner;

shift control means for outputting a control signal to correct the pressure of transmission oil according to the temperature of intake air and the operational state of the air conditioner input from the engine control means, if conditions for a kick down shift are met with reception of the signal checked by the vehicle running state sensing means; and driving means for controlling the oil pressure discharged out by an oil pump according to the control signal output from the shift control means and performing a shift by providing the oil pressure for a relevant friction factor, wherein the shift control means determines a first correction duty with the temperature of intake air on the basis of a preset Map Table and a second correction duty with the operational state of an air conditioner and operates a pressure control solenoid valve with a duty obtained by adding the first and second correction duties to a reference duty.

2. A method for controlling a kick down shift of an automatic transmission, the method comprising the steps of:

discriminating whether conditions for a kick down shift are satisfied while a vehicle is in motion;

discriminating whether the temperature of intake air is higher than a reference temperature if all the conditions are satisfied for the kick down shift;

adjusting a transmission oil pressure if the temperature of intake air is higher than the reference temperature, and performing the kick down shift with the adjusted transmission oil pressure; and determining a first correction duty with the temperature of intake air on the basis of a preset Map Table and a second correction duty with the operational state of an air conditioner and operating a pressure control solenoid valve with a duty obtained by adding the first and second correction duties to a reference duty.

3. The method, as defined in claim 2, wherein the second correction duty is set at 3% if the air conditioner is in operation.

* * * * *